United States Patent
Pickens et al.

(10) Patent No.: US 7,726,296 B2
(45) Date of Patent: Jun. 1, 2010

(54) DRYWELL TABLE

(75) Inventors: Darrell Pickens, Hesperia, CA (US);
Rick Winfree, Mission Viejo, CA (US);
Todd D. Evans, Corona, CA (US)

(73) Assignee: Taco Bell, Corp., Irvine, CA (US)

( * ) Notice: Subject to any disclaimer, the term of this patent is extended or adjusted under 35 U.S.C. 154(b) by 1030 days.

(21) Appl. No.: 11/251,631

(22) Filed: Oct. 14, 2005

(65) Prior Publication Data
US 2007/0079822 A1    Apr. 12, 2007

Related U.S. Application Data

(60) Provisional application No. 60/725,594, filed on Oct. 11, 2005.

(51) Int. Cl.
*A47G 23/04* (2006.01)
(52) U.S. Cl. .......................... 126/246; 126/33
(58) Field of Classification Search .................. 126/33, 126/246, 377.1
See application file for complete search history.

(56) References Cited

U.S. PATENT DOCUMENTS 3,784,787 A * 1/1974 Shevlin ...................... 219/386
5,381,729 A * 1/1995 Hennessy et al. ............. 99/483

OTHER PUBLICATIONS

Picture of open-air drywell table design with heating elements located below the table, the sidewalls of the table conducting heat from the bottom of the table, in use more than one year before Oct. 14, 2005.

* cited by examiner

*Primary Examiner*—Alfred Basichas
(74) *Attorney, Agent, or Firm*—Knobbe Martens Olson & Bear, LLP (57) ABSTRACT

A drywell table includes a top frame defining at least one opening configured to receive a serving pan therethrough and a heating plate disposed below the top frame. The drywell table also includes at least two heating fins extending between the heating plate and the top frame, and defining at least one row configured to receive the pan therein, wherein heat is transferred from the heating plate and heating fins to the serving pan via a sufficiently small air gap defined between the heating plate, heating fins and the serving pan, wherein the gap minimizes convection and radiation.

17 Claims, 8 Drawing Sheets

DRYWELL TABLE

CROSS-REFERENCE TO RELATED APPLICATIONS

This application claims priority to U.S. Provisional Application No. 60/725,594, titled "DRY WELL TABLE" and filed Oct. 11, 2005, the entire contents of which are hereby incorporated by reference and should be considered a part of this specification.

BACKGROUND OF THE INVENTION

1. Field of the Invention

This invention relates in general to food warming tables, and more particularly to a drywell warming table for maintaining food at a temperature above 140° F.

2. Description of the Related Art

Restaurants often prepare various ingredients (e.g., sauces) in advance of assembling, the meal or food product in order to speed the preparation time for the meal Typically, such restaurants will prepare some cooked food and/or ingredients in advance and keep that food warm, for example, using a warming table.

One typical design for a warming table, a steam table, includes a steam bath. In such designs, steam is generated by heating an amount of water between the pans and heating table. The steam keeps the serving pans, and the food contained therein, warm.

Another typical design includes serving pans made of plastic and stainless steel. The pans are disposed within a drywell such that there is a sufficiently small air gap between the pans and the heating table. In such designs, the heating table is heated to a desired temperature and the food in the serving pans is heated primarily via conduction heat transfer through the stagnant air between the heating table and the serving pans.

Typically, as the level of food in the serving pans decreases, it is necessary to increase the amount of heat applied to the pans to keep the food within the desired serving temperature range. However, application of additional heat may lead to the boiling of the food when the pan is full, making it unsuitable for immediate consumption. Additionally, when less than 1 inch of food remains in the pan, the temperature of the food tends to decrease even when the amount of heat applied to the pans is increased, making the heating operation inefficient. The increased heat tends to escape through the surface of the pan not in contact with the food.

Accordingly, there is a need for an improved drywell table to maintain food at a desired temperature for serving.

SUMMARY OF THE INVENTION

In accordance with one of the embodiments disclosed herein, a drywell table is provided, comprising a top frame defining at least one opening configured to receive a serving pan therethrough. A heating plate is disposed below the top frame. At least two heating fins extend between the heating plate and the top frame, and define at least one row configured to receive the pan therein. Heat is transferred from the heating plate and heating fins to the serving pan via a sufficiently small air gap defined between the heating plate, heating fins and the serving pan to minimize convection and radiation.

DETAILED DESCRIPTION OF THE PREFERRED EMBODIMENTS

In the following detailed description, terms of orientation such as "top," "bottom," "upper," "lower," "front," "rear," "left," "center," "right," and "end" are used herein to simplify the description of the context of the illustrated embodiments. Likewise, terms of sequence such as "first," "second," and "third" are used to simplify the description of the illustrated embodiments. Because other orientation and sequences are possible, however, the present invention should not be limited to the illustrated orientation or sequence. Those skilled in the art will appreciate that other orientations of the drywell table as described herein are possible.

Figure 1:
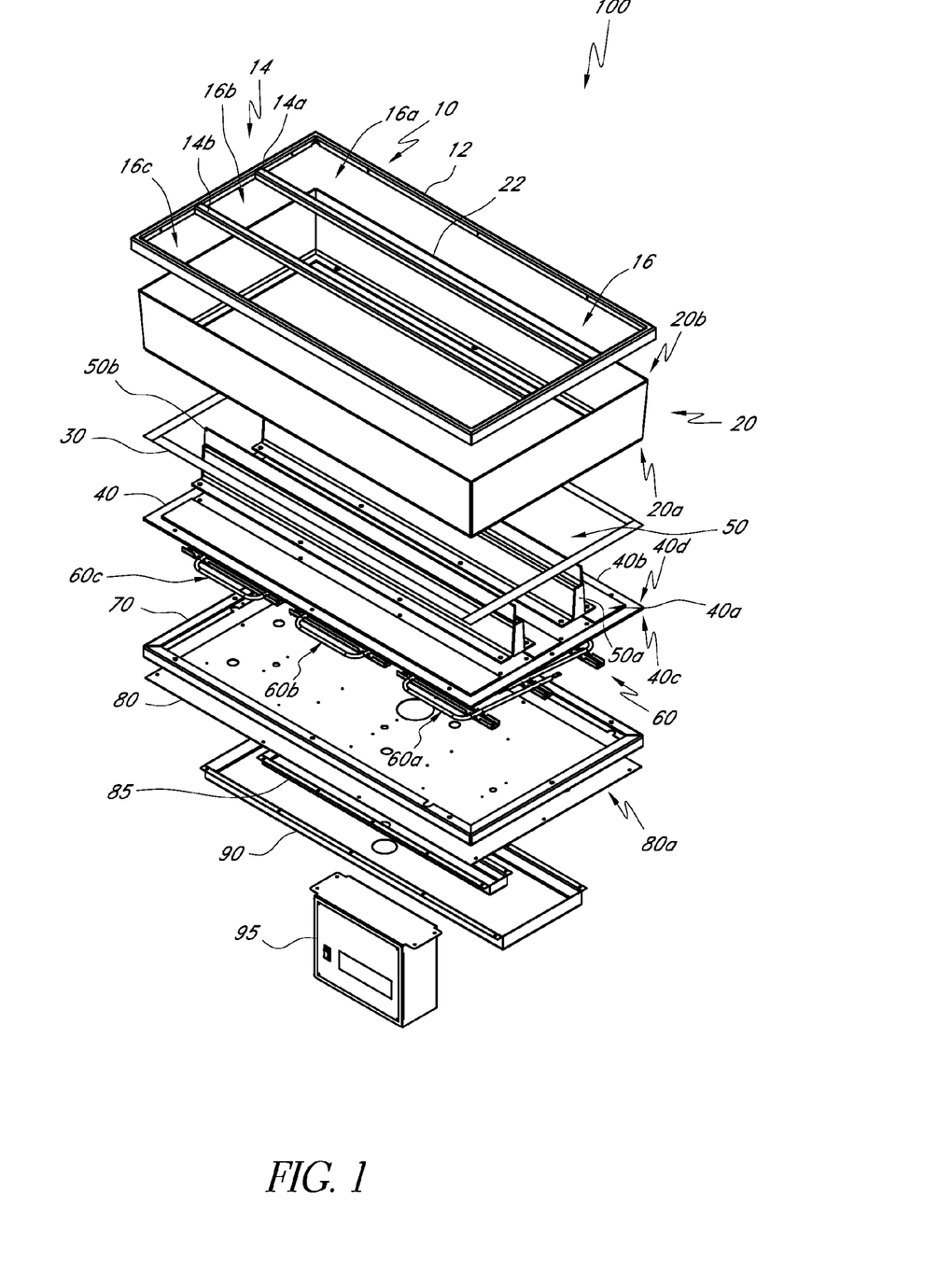
FIG. 1 is an exploded view of a drywell table in accordance with one of the embodiments disclosed herein.

FIGS. 1-9 illustrate one embodiment of a drywell table or drywell assembly 100, in accordance with the one embodiment. As shown in FIG. 1, the drywell table 100 includes a top frame 10 that is removably attached to a liner 20. The top frame 10 preferably includes a peripheral edge 12 and at least one partition 14 so as to define at least one opening 16 in the frame. In the illustrated embodiment, the top frame 10 has a first partition 14a and a second partition 14b and defines a first opening 16a, a second opening 16b, and a third opening 16c, wherein the second opening 16b is between the first and third openings 16a, 16b. The liner 20 preferably includes a peripheral wall 22 extending from a bottom edge 20a to a top edge 20b, wherein the top edge 20b is sized such that the peripheral edge 12 of the top frame 10 overlaps the top edge 20b of the liner 20. The top frame 10 can be fastened to the liner 20 via any suitable mechanism, such as welds, clamps, and a press-fit connection. The frame 10 is preferably made of any suitable material, such as metal and metal alloys. The liner 20 is made of any metal alloy with a high conductivity suitable for foot contact splash zones. In one embodiment, the top frame 10 is made of stainless steel and the liner 20 is made of aluminum.

In the illustrated embodiment, a gasket 30 is peripherally disposed between the liner 20 and a heating table 40. Specifically, the gasket 30 is disposed between the bottom edge 20a of the liner 20 and a machined edge 40d that extends about the periphery of a top face 40a of the heating table 40. In one embodiment, the gasket 30 is a high-temperature gasket tape disposed along the periphery of the heating table 40. The heating table 40 preferably includes at least one heating fin 50 extending generally vertically from the top face 40a. In the illustrated embodiment, the heating table 40 has two heating fins 50a, 50b extending therefrom. However, one of ordinary skill in the art will recognize that the heating table 40 can have any number of heating fins. In another embodiment, the heating table 40 may have heating fins extending along an outer edge 40b of the top surface 40a. For example, the liner 20 can include heating surfaces 50c, 50d that extend from the outer edge 40b of the top surface 40a (see FIG. 6). Preferably, the heating table 40 is made of metal or metal alloy with a high thermal diffusivity. In one preferred embodiment, the heating table 40 is made of anodized aluminum. The configuration and operation of the heating fins 50a, 50b is discussed further below.

At least one heating element 60 is preferably disposed on a bottom face 40c of the heating table 40. In the illustrated embodiment, three heating elements 60a, 60b, 60c are disposed along the bottom face 40c of the heating table 40. However, one of ordinary skill in the art will recognize that the heating table 40 can have any number of heating elements 60 attached to the bottom face 40c thereof.

As shown on FIG. 1, the drywell table 100 also has a retaining channel 70 disposed proximal the heating elements 60a, 60b, 60c. In one embodiment, the retaining channel 70 can be adjacent the heating elements 60a, 60b, 60c. The retaining channel 70 is preferably fastened to the bottom face 40c of the heating table 40 and removably holds an insulating material (not shown) therein. In one embodiment, the insulation material can be made of fiberglass. As shown in FIG. 1, a base 80 is preferably removably fastened to the retaining channel 70. In one embodiment, the base 80 is made of stainless steel. However, the base 80 can be made of any suitable metal or metal alloy. Inner and outer wiring chases 85, 90 are preferably disposed on a bottom face 80a of the base 80. Additionally, the drywell table 100 includes a control box 95, as shown in FIG. 1. The control box 95 preferably controls the operation of the heating elements 60a, 60b, 60c.

Figure 2:
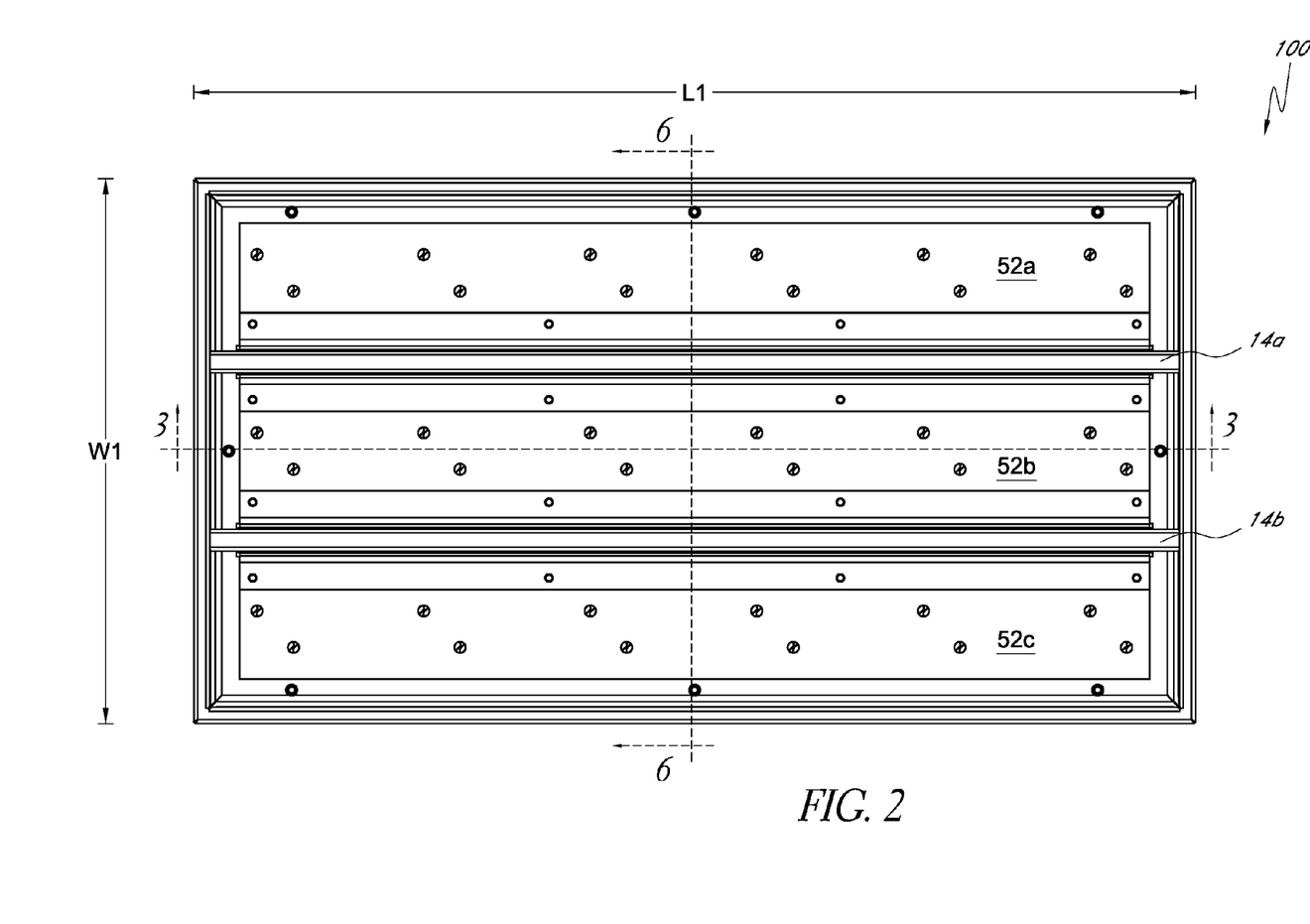
FIG. 2 is a top view of the drywell table of FIG. 1.
Figure 3:
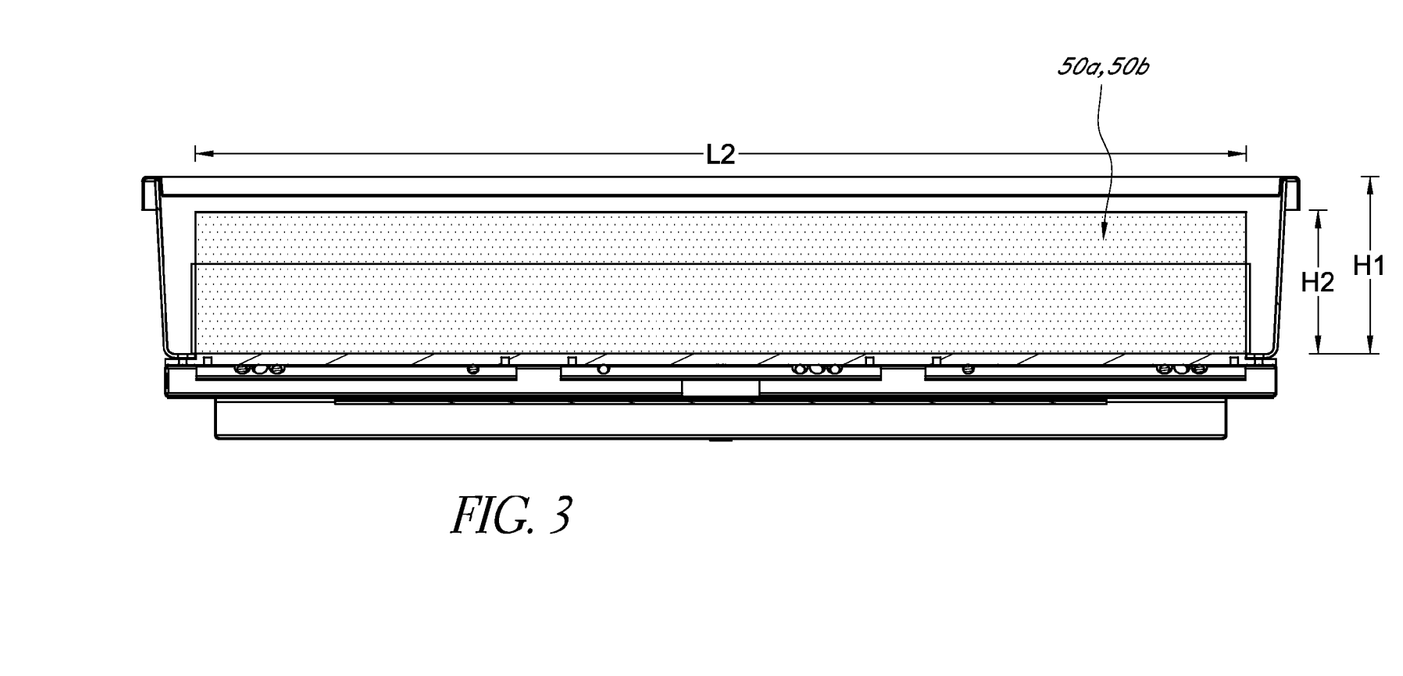
FIG. 3 is a cross-sectional side view along lines B-B, as shown in FIG. 2.
Figure 4:
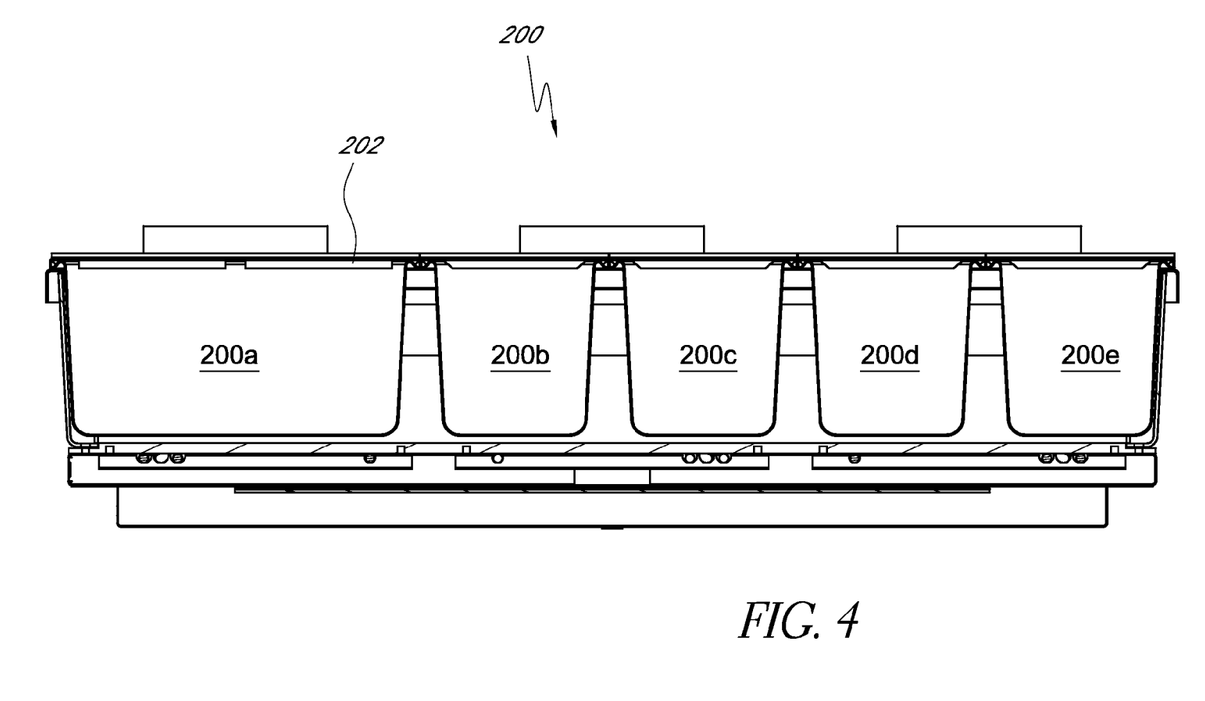
FIG. 4 is a cross-sectional side view along Section B-B shown in FIG. 2, above, with serving pans disposed therein.

With reference to FIGS. 2-4, the drywell table 100 has a generally rectangular shape having a length L1 and a width W1. However, the drywell table 100 can have other suitable shapes, such as square and trapezoidal. In one embodiment, the length L1 of the drywell system is about 39 inches. Additionally, the width W1 of the drywell system is preferably between about 20 inches and about 40 inches.

Figure 6:
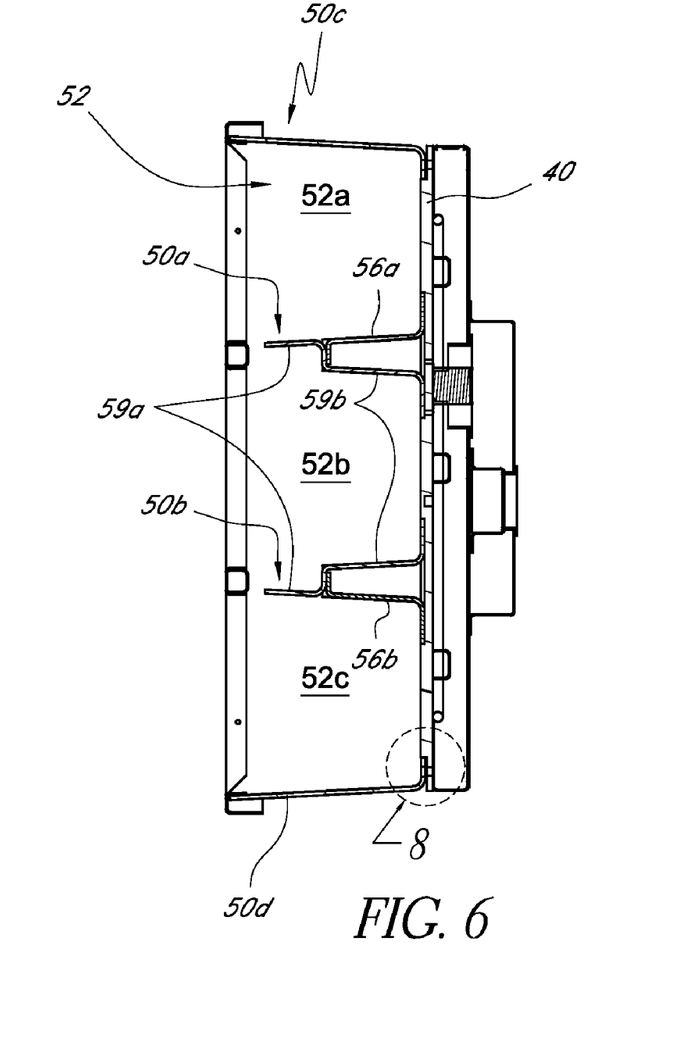
FIG. 6 is a cross-sectional side view along Section A-A shown in FIG. 2.

As shown in FIG. 6, in one embodiment the heating fins 50a, 50b define separate rows 52 within the drywell assembly. Each row 52 has an elongated groove-like shape defined by a bottom section flanked by side sections. In the illustrated embodiment, the side sections of each row 52 extend upwardly from the corresponding bottom section and generally parallel to each other so as to give the row 52 a uniform cross-section along its length. In the illustrated embodiment, the drywell assembly 100 has three rows 52a, 52b, 52c. However, one of ordinary skill in the art will recognize that the drywell assembly 100 can be assembled to have any number of rows 52 and other configurations (for example, a symmetric configuration or a non-uniform cross-section). As shown in FIG. 2, the first, second and third rows 52a, 52b, 52c extend longitudinally along substantially the entire length of the drywell assembly 100. Further, the heating fins 50a, 50b preferably have a length L2 substantially equal to the length L1 of the drywell assembly 100, as shown in FIG. 3. In one embodiment, the length of the heating fins 50a, 50b is between about 37 inches and about 38 inches. Additionally, the height H2 of the heating fins 50a, 50b is preferably smaller than a height H1 of the drywell assembly 100. In one preferred embodiment, the height H2 of the heating fins 50a, 50b is between about 0.875 inch and about 1.125 inches shorter than the height H1 of the drywell assembly 100.

As shown in FIG. 4, the rows 52a, 52b, 52c are preferably sized to receive multiple serving pans 200 therein. The serving pans 200 can have various sizes. In the illustrated embodiment, five pans 200a-200e of different sizes are shown. However, the rows 52a, 52b, 52c can also receive one serving pan extending substantially along the entire length of the row. In another embodiment, the pans 200 can all be the same size. The serving pans 200 are preferably removably disposed in the drywell assembly 100. In one embodiment, the pans 200 can have a top edge 202 configured to engage the top frame 10 and "hang" or rest upon standoffs within the rows 52a, 52b, 52c so that a sufficiently small air gap exists between the top face 40a of the heating table 40, the heating fins 50a, 50b and the surface of the serving pans 200, as further discussed below.

Figure 5:
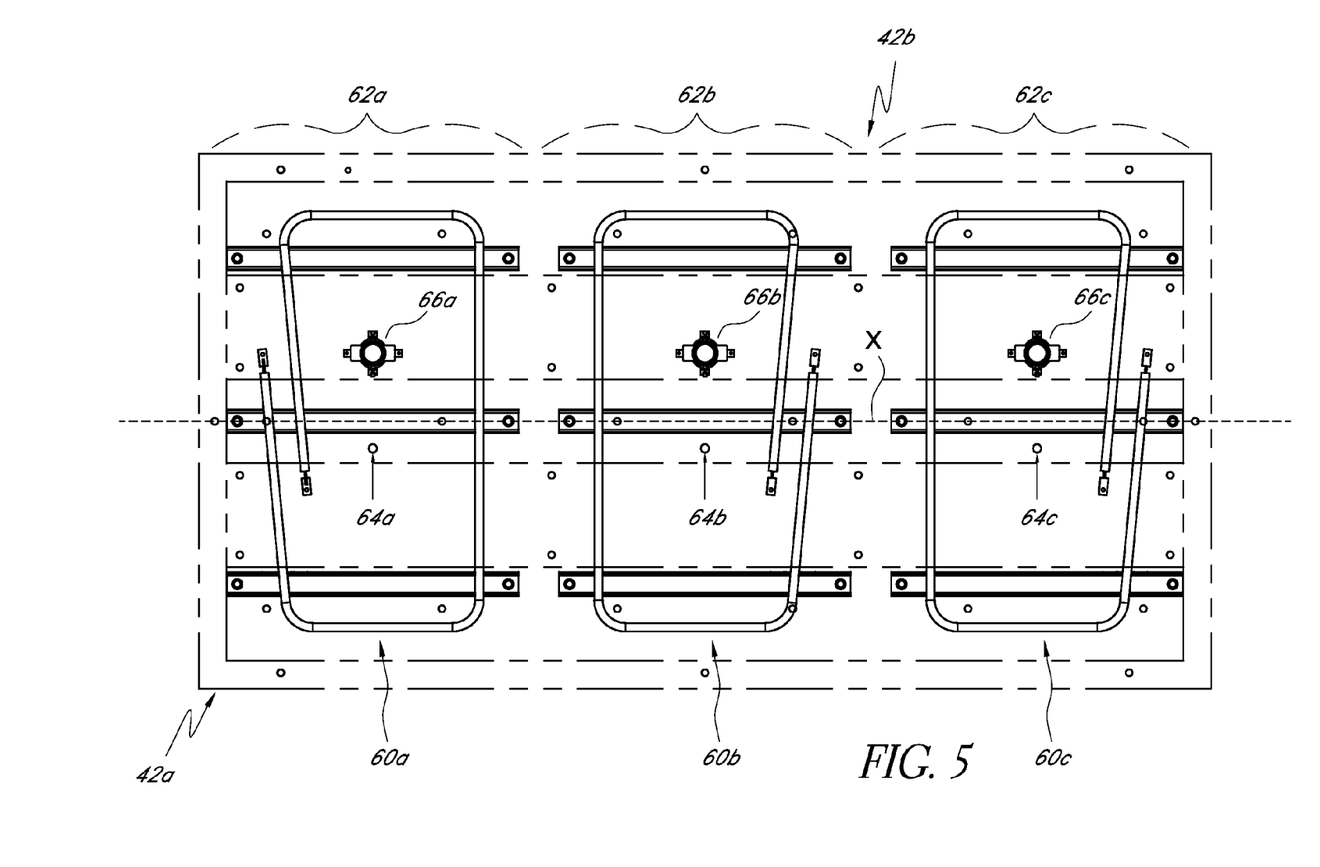
FIG. 5 is a bottom view of the drywell table in accordance with one of the embodiments disclosed herein.

As illustrated in FIG. 5, three heating elements 60a, 60b, 60c are disposed on the bottom face 40c of the heating table 40. The first heating element 60a is disposed on a left side of the heating table 40 so as to provide a left heat zone 62a. Similarly, the second heating element 60b is disposed generally in the center of the heating table 40 so as to provide a central heat zone 62b. The third heating element 60c is disposed on a right side of the heating table so as to provide a right heat zone 62c. The heating elements 60a, 60b, 60c are preferably fastened to the bottom face 40c of the heating table 40 via any suitable mechanism, such as welds, screws, bolts, brackets and the like.

As shown in FIG. 5, each of the heating elements 60a, 60b, 60c has a generally rectangular configuration extending from one side 42a of the heating table 40 to an opposite side 42b. Additionally, temperature probes 64a, 64b, 64c are preferably disposed generally in the center of each of the heat zones 62a, 62b, 62c, respectively. Preferably, the temperature probes 64a, 64b, 64c are disposed so as to accurately measure the temperature at a location that is representative of the temperature within the heat zone. Though three temperature probes 64a, 64b, 64c are shown in the illustrated embodiment, one of ordinary skill in the art will recognize that any number of temperature probes can be used. In one embodiment, the temperature probes 64a, 64b, 64c can be thermocouples. In another embodiment, the temperature probes 64a, 64b, 64c can be made of a fiberglass wire.

FIG. 5 also shows temperature limit switches 66a, 66b, 66c disposed in each heat zone 62a, 62b, 62c, respectively. In the illustrated embodiment, the high-limit temperature switches 66a, 66b, 66c are disposed opposite the corresponding temperature probe 64a, 64b, 64c for the heat zones 62a, 62b, 62c about a longitudinal axis X of the heating table 40. Preferably, the high-limit temperature switches 66a, 66b, 66c are configured to shut-off the power supplied to the heating elements 60a, 60b, 60c, respectively. In one embodiment, each of the temperature switches 66a, 66b, 66c is preferably configured to shut-off power to the corresponding heating element 60a, 60b, 60c when the temperature in the corresponding heat zone 62a, 62b, 62c exceeds a temperature limit set point. In one embodiment, the temperature limit set point for shutting off power is about 370° F. Preferably, the temperature switches 66a, 66b, 66c operate independently of each other and communicate with the control box 95. Likewise, each of the temperature probes 64a, 64b, 64c preferably operates independently of each other and communicates independently with the control box 95.

FIGS. 6-9 illustrate in greater detail the heating fins 50a, 50b of the drywell table 100 in accordance with one embodiment. In the illustrated embodiment, the heating fins 50a, 50b extend generally vertically from the top face 40a of the heating table 40. As discussed above, the height H2 of at least two of the heating fins 50a, 50b is preferably less than the height H1 (see FIG. 3) from the top face 40a of the heating table 40 to the top frame 10. In one embodiment, the height H1 is about 1.25 inches shorter than the distance from the top face 40d to the top of the serving pan 200. However, the distance between the height H1 and the top face 40d of the top of the serving pan 200 be more or less than 1.25 inches.

Figure 7:
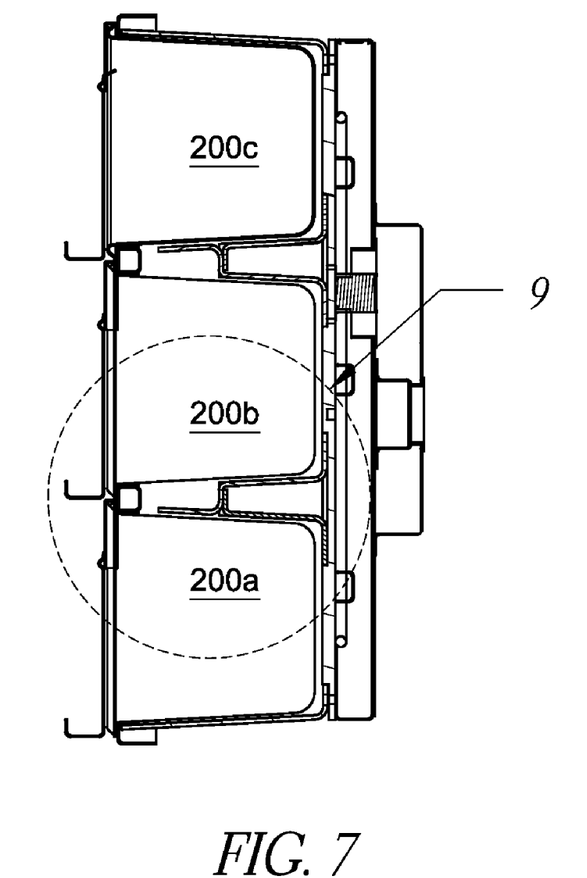
FIG. 7 is a cross-sectional side view along Section A-A shown in FIG. 2, with serving pans disposed therein.

As shown in FIGS. 6 and 7, the heating fins 50a, 50b define generally tapered rows 52a, 52b, 52c that taper toward the top face 40a. In one embodiment, each of the fins 50a, 50b extends at an angle θ generally between about 90 degrees and about 95 degrees, and more preferably 93 degrees relative to the top face 40a of the heating table 40. In the illustrated embodiment, all of the heating fins 50a, 50b are oriented at the same angle θ relative to the top face 40a of the heating table 40. In another embodiment, the heating fins 50a, 50b can extend at different angles relative to the top face 40a.

As shown in FIG. 6, the heating table 40 has two heating fins 50a, 50b disposed thereon. First and second heating fins 50a, 50b extend upward from the top face 40a of the heating table 40. The first and second heating fins 50a, 50b preferably have the same height and general shape. The first heating fin 50a has a cross-section generally in the shape of a reverse "h." Similarly, the second heating fin 50b has a cross-section generally in the shape of an "h.".

With continued reference to FIGS. 6 and 7, the first and second heating fins 50a, 50b each have a generally continuous linear boundary 56a, 56b. Additionally, the first and second heating fins 50a, 50b define a generally nonlinear boundary 58a, 58b facing the second row 52b. When the serving pans 200 are placed in each of the rows 52a, 52b, 52c, a generally uniform gap preferably exists between the surface of the pan 200 and the generally linear boundary 56a, 56b of the first and second heating fins 50a, 50b. Likewise, there is generally a uniform gap between the liner 20 and the surface of the serving pans 200 adjacent thereto.

With regards to the first and second heating fins 50a, 50b, the generally nonlinear boundary 58a, 58b includes an upper portion 59a and a lower portion 59b, wherein a generally uniform gap exists between the pan 200 in the second row 52b and the lower portion 59b of the nonlinear boundaries 58a, 58b. However, the gap between the upper portion 59a of the nonlinear boundaries 58a, 58b and the pan 200 disposed in the second row 52b is greater than the gap between the lower portion 59b of the nonlinear boundaries 58a, 58b and the surface of the serving pan 200. In one embodiment, the gap between the heating fins 50a, 50b, as well as liner 20, and the serving pans 200 is at least about 0.125 inch. In another embodiment, the gap between the bottom surface of the pans 200 and the top face 40a of the heating table 40 is generally about 0.25 inch.

Figure 8:
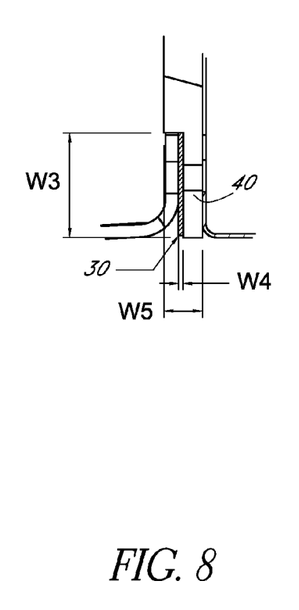
FIG. 8 is a sectional view of detail A shown in FIG. 6.
Figure 9:
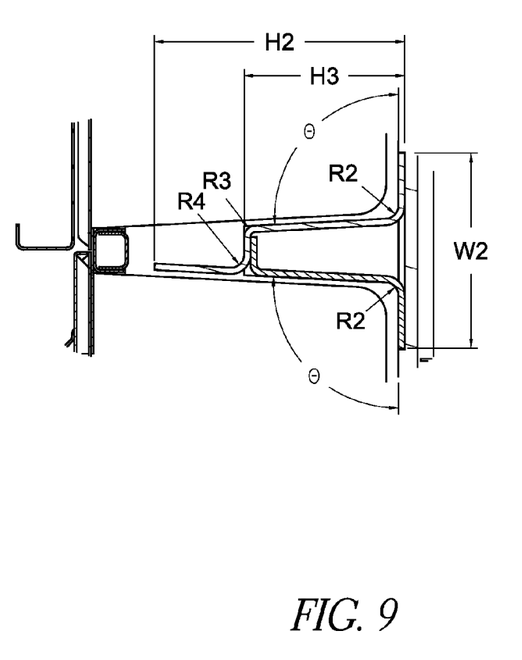
FIG. 9 is a cross-sectional side view of detail B shown in FIG. 7.

As shown in FIGS. 8 and 9, the lower portion 59b has a height H3, which is preferably between about 2.25 inches and about 2.75 inches. Additionally, the first and second heating fins 50a, 50b have a base width W2 along the top face 40a. The base width W2 is preferably between about 3.75 inches and about 3.875 inches. In the illustrated embodiment, the lower portions 59a of the heating fins 50a, 50b have a first radius of curvature R2. In one preferred embodiment, the first radius of curvature R2 is about 0.125 inch. The upper portion 59b has a first radius of curvature R3 at the junction with the lower portion 59a, and a second radius of curvature R4. In one preferred embodiment, the first radius of curvature R3 is about 0.125 inch, and the second radius of curvature R4 is about 0.25 inch. As shown in FIG. 8, the gasket 30 preferably has a thickness W4 of about 0.5 inch. Additionally, the heating plate 40 has a thickness W5 of between about 0.375 inch and about 0.5 inch.

In one embodiment, the heating table 40 preferably has a thickness of about 0.375 inch and the heating fins 50a, 50b preferably have a thickness of about 0.125 inch. Additionally, the heating table 40 and heating fins 50a, 50b are preferably made of a material with a high thermal conductivity and diffusivity. In one embodiment, the heating table 40 and heating fins 50a, 50b are made of aluminum. However, other materials or materials with high thermal conductivity coefficients can be used. Preferably, the serving pans 200 are made of stainless steel.

During operation, the hearing elements 50a, 50b, 50c provide a heat flux to the bottom face 40c of the heating table 40. The heat flux is communicated to the top face 40a via conductive heat transfer through the heating table 40. Heat also flows from the top face 40a to the heating fins 50a, 50b and the liner 20. Heat is then transferred from the top face 40a and the heating fins 50a, 50b onto the serving pans 200 disposed in the rows 52a, 52b, 52c. Said heat is preferably primarily transferred via conductive heat transfer through a sufficiently small air gap, which minimizes convection and radiation. The heating fins 50a, 50b and liner 20 advantageously provide heat to the sides of the serving pans 200 to efficiently maintain the temperature of the food within a desired temperature range. Because, heat is also supplied to the sides of the serving pans 200, the heating elements 60a, 60b, 60c can be operated efficiently to uniformly heat the food in the pans 200 without supplying more heat to the heating plate 40 than necessary.

Additionally, the cross-sectional shape of the first and second heating fins 50a, 50b advantageously prevents the overheating of the pan 200 disposed in the second row 52b of the drywell assembly 100. That is, the generally nonlinear boundary 58a, 58b of the first and second heating fins 50a, 50b that face the pan 200 disposed in the second row 52b allow for a greater air gap between the top portion 59a of the heating fins 50a, 50b and the pan 200, reducing the amount of heat transferred onto the top portion of the pan 200 via conduction through the air gap.

The drywell table 100 in accordance with the embodiments disclosed herein advantageously provide a mechanism to more uniformly heat serving pans 200 disposed in the rows 52a, 52b, 52c to maintain the food contained therein within a generally desired temperature range regardless of the level of food in the pans 200. Additionally, the heating fins 50a, 50b and liner 20 provide for more efficient heating of the food within the pans 200, and allow for simpler regulation of the temperature of the food in the pans 200. Moreover, the heating fins 50a, 50b and liner 20 allow the efficient use of power to operate the heating elements 60a, 60b, 60c in order to maintain the heating pans 200 at the desired temperature.

Of course, the foregoing description is that of certain features, aspects and advantages of the present invention, to which various changes and modifications can be made without departing from the spirit and scope of the present invention. Moreover, the drywell table need not feature all of the objects, advantages, features, and aspects discussed above. Thus, for example, those skilled in the art will recognize that the invention can be embodied or carried out in a manner that achieves or optimizes one advantage or a group of advantages as taught herein without necessarily achieving other objects or advantages as may be taught or suggested herein. In addition, while a number variations of the invention have been shown and described in detail, other modifications and methods of use, which are within the scope of this invention, will be readily apparent to those of skill in the art based upon this disclosure. It is contemplated that various combinations or sub-combinations of these specific features and aspects of embodiments may be made and still fall within the scope of the invention. According, it should be understood that various features and aspects of the disclosed embodiments can be combined with or substituted for one another in order to form varying modes of the discussed drywell table.

What is claimed is:

1. A drywell table, comprising:
a top frame defining at least one opening configured to receive a serving pan therethrough;
a heating plate disposed below the top frame;
a liner disposed between the top frame and the heating plate, the liner comprising a circumferential outer wall that defines a cavity above the heating plate; and
at least two heating fins extending between the heating plate and the top frame, the heating fins defining at least three rows within the cavity defined by the circumferential outer wall, each row configured to receive the pan therein, wherein heat is transferred from the heating plate and heating fins to the serving pan primarily via conduction through stagnant air in an air gap defined between the heating plate, heating fins and the serving pan, the air gap comprising a generally uniform gap between a surface of the fin and a surface of the serving pan disposed adjacent to and facing the fin, said air gap allowing for generally uniform heating of the serving pan to maintain food in the serving pan above a desired food serving temperature even when the level of food in the serving pan falls below one inch, and configured to minimize convection and radiation heat transfer between the heating plate and heating fins and the serving pan.

2. The drywell table of claim 1, wherein each of the heating fins has a linear boundary on one side of the heating fin and a non-linear boundary on an opposite side of the heating fin, the non-linear boundary configured to inhibit the over-heating of a pan disposed adjacent thereto.

3. The drywell table of claim 2, wherein the linear boundary and the non-linear boundary of the fins define an "h" shape or reverse "h" shape, each of which has two legs attached to the heating plate inwardly of the circumferential outer wall.

4. The drywell table of claim 1, wherein the air gap comprises a generally uniform gap between the heating fins and the serving pan along the length of the fins and so that the heating fins and serving pan do not contact each other.

5. The drywell table of claim 1, wherein the air gap comprises a generally uniform gap between the heating table and the serving pan of about ¼ inch.

6. The drywell table of claim 1, wherein the air gap between the heating fin and serving pan is a generally uniform air gap of about 0.125 inches.

7. A drywell table, comprising:
a heating plate configured to direct heat to at least one serving pan disposed above the heating plate;
a liner attached to the heating plate and comprising a circumferential outer wall that defines a cavity above the heating plate; and
at least one heating fin extending from the heating plate and defining at least two channels in the cavity defined by the circumferential outer wall, each channel configured to receive the serving pan therein, wherein heat is transferred from the heating plate and heating fin to the serving pan primarily via conduction through stagnant air in an air gap defined between the heating plate, heating fin and the serving pan, said air gap comprising a generally uniform gap between a surface of the fin and a surface of the serving pan disposed adjacent to and facing the fin, said air gap allowing for generally uniform heating of the serving pan to maintain food in the serving pan above 140° F. even when the level of food in the serving pan falls below one inch, and configured to minimize convection and radiation heat transfer between the heating plate and at least one heating fin and the at least one serving pan.

8. The drywell table of claim 7, wherein each heating fin has a generally h-shape or reverse h-shape, each of which has two legs attached to the heating plate inwardly of the circumferential outer wall.

9. The drywell table of claim 7, wherein the air gap comprises a generally uniform gap between the heating fin and the serving pan so that the heating fin and serving pan do not contact each other.

10. The drywell table of claim 7, wherein the air gap comprises a generally uniform gap between the heating table and the serving pan of about ¼ inch.

11. The drywell table of claim 7, wherein the air gap between the heating fin and serving pan is a generally uniform air gap of about 0.125 inches.

12. A drywell table, comprising:
a heating plate configured to direct heat to at least one serving pan disposed above the heating plate;
a liner disposed above the heating plate and comprising a circumferential outer wall that extends along the periphery of the heating plate; and
at least one heating fin extending from the heating plate within a cavity defined by the circumferential outer wall and heating table, the at least one heating fin defining at least two channels configured to receive the serving pan therein, wherein heat is transferred from the heating plate and heating fin to the serving pan primarily via conduction through stagnant air in an air gap defined between the heating plate, heating fin and the serving pan, the air gap comprising a generally uniform gap between a surface of the fin and a surface of the serving pan disposed adjacent to and facing the fin, said uniform air gap allowing for the generally uniform heating of the serving pan to maintain food in the serving pan generally within a desired food serving temperature range regardless of the amount of food in the serving pan.

13. The drywell table of claim 12, wherein each heating fin has a generally h-shape or reverse h-shape, each of which has two legs attached to the heating table inwardly of the circumferential outer wall.

14. The drywell table of claim 12, wherein the air gap between the heating fin and serving pan is a generally uniform air gap of about 0.125 inches.

15. A method for operating a drywell table to heat food, comprising:
placing a serving pan over a heating table having a circumferential outer wall, at least one heating fin extending from the heating table within a cavity defined by the circumferential outer wall and inwardly from the circumferential outer wall, so that at least a portion of the circumferential outer wall and a surface of the heating fin are adjacent a side surface of the serving pan, and so that a bottom of the serving pan is spaced from the heating table by a first air gap and a surface of the heating fin is spaced from a side surface of the serving pan by a generally uniform second air gap; and
heating the serving pan via heat transferred from the heating table and heating fins primarily via conduction through stagnant air in the first and second air gaps, the generally uniform second air gap allowing for the generally uniform heating of the serving pan to maintain food in the serving pan above 140° F. regardless of the amount of food in the serving pan.

16. The method of claim 15, wherein the first air gap is about ¼ inch across and the generally uniform second air gap is about ⅛ inch across.

17. The method of claim 15, wherein heating comprises heating the serving pan via one or more heating elements disposed on an opposite side of the heating table from the serving pan.

* * * * *

UNITED STATES PATENT AND TRADEMARK OFFICE
CERTIFICATE OF CORRECTION

PATENT NO. : 7,726,296 B2  
APPLICATION NO. : 11/251631  
DATED : June 1, 2010  
INVENTOR(S) : Darrell Pickens et al.

Page 1 of 1

It is certified that error appears in the above-identified patent and that said Letters Patent is hereby corrected as shown below:

At column 1, line 20, please delete "assembling," and insert --assembling--, therefor.

At column 5, line 11, please delete "an "h."." and insert --an "h".--, therefor.

Signed and Sealed this

Twenty-first Day of December, 2010

David J. Kappos  
*Director of the United States Patent and Trademark Office*